US012678808B2

(12) United States Patent
Chen

(10) Patent No.: US 12,678,808 B2
(45) Date of Patent: Jul. 14, 2026

(54) SHOWER HEAD WITH TEETH FLUSHING DEVICE

(71) Applicant: Jeff Chen, Chiayi City (TW)

(72) Inventor: Jeff Chen, Chiayi City (TW)

( * ) Notice: Subject to any disclaimer, the term of this patent is extended or adjusted under 35 U.S.C. 154(b) by 808 days.

(21) Appl. No.: 18/175,652

(22) Filed: Feb. 28, 2023

(65) Prior Publication Data

US 2024/0286149 A1 Aug. 29, 2024

(51) Int. Cl.
| *B05B 1/16* | (2006.01) |
| *A61C 17/032* | (2006.01) |
| *B05B 1/18* | (2006.01) |
| *B05B 15/40* | (2018.01) |

(52) U.S. Cl.
CPC .......... *B05B 1/1609* (2013.01); *A61C 17/032* (2019.05); *B05B 1/185* (2013.01); *B05B 15/40* (2018.02)

(58) Field of Classification Search
CPC ... B05B 1/1609; B05B 1/1618; B05B 1/1627; B05B 1/1663; B05B 1/1681; B05B 15/40; B05B 1/185; B05B 1/182; B05B 1/188; B05B 1/1882; B05B 1/1884; B05B 1/1892; B05B 1/18; A61C 17/032
USPC .................................................. 239/289, 443
See application file for complete search history.

(56) References Cited

U.S. PATENT DOCUMENTS

| 2015/0102130 A1* | 4/2015 | Davenport ................ B05B 1/16 |
| | | 239/289 |
| 2023/0311135 A1* | 10/2023 | Liu ....................... B05B 1/1681 |
| | | 239/562 |

FOREIGN PATENT DOCUMENTS

CN         218132609 U   * 12/2022

* cited by examiner

*Primary Examiner* — Arthur O. Hall
*Assistant Examiner* — Juan C Barrera
(74) *Attorney, Agent, or Firm* — LANWAY IPR SERVICES; Chun-Ming Shih

(57) ABSTRACT

A shower head contains: a body, a showering assembly, a switch button, a shift assembly, and a flushing pipe. The body includes a handle, a head portion, an inlet segment, a water supply chamber, an outlet segment, a tab, and a notch. The showering assembly is connected with the water supply chamber. The switch button includes two locking extensions. The shift assembly includes a water distribution projection which has a central orifice, a coupling portion, and a hemispherical rubber ring. The movable seat has a first conduit and an actuated element. The movable seat has a water guider and a spherical abutting face. The flushing pipe includes a channel, and an end of the flushing pipe is connected on a top of the central orifice of the water distribution projection. The flushing pipe includes a washing segment and a spray nozzle.

4 Claims, 6 Drawing Sheets

SHOWER HEAD WITH TEETH FLUSHING DEVICE

TECHNICAL FIELD

The present invention relates to a shower head which is capable of taking the shower and flushing teeth of the user.

BACKGROUND

A conventional shower head is only applied to take a shower, and a conventional teeth flushing device is hang on a support rack, thus occupying a bathroom and limiting usage of the conventional shower head and teeth flushing device.

The present invention has arisen to mitigate and/or obviate the afore-described disadvantages.

SUMMARY

The primary aspect of the present invention is to provide a shower head which is capable of taking the shower and flushing teeth of the user.

When desiring to take a shower by using the shower head, the switch button is switched upward to drive the spherical abutting face of the water guider to engage with the hemispherical rubber ring of the water distribution projection matingly so that the water sprays out of the spray nozzle of the washing segment from the inlet segment of the handle via the first conduit of the movable seat, the through orifice of the water guider, the central orifice, and the flushing pipe. When desiring to flushing teeth of a user, the switch button is switched downward so that the spherical abutting face of the water guider disengages from the hemispherical rubber ring of the water distribution projection and the water sprays out of the showering assembly from the inlet segment of the handle via the outlet segment and across the water guider.

DETAILED DESCRIPTION

Figure 1:
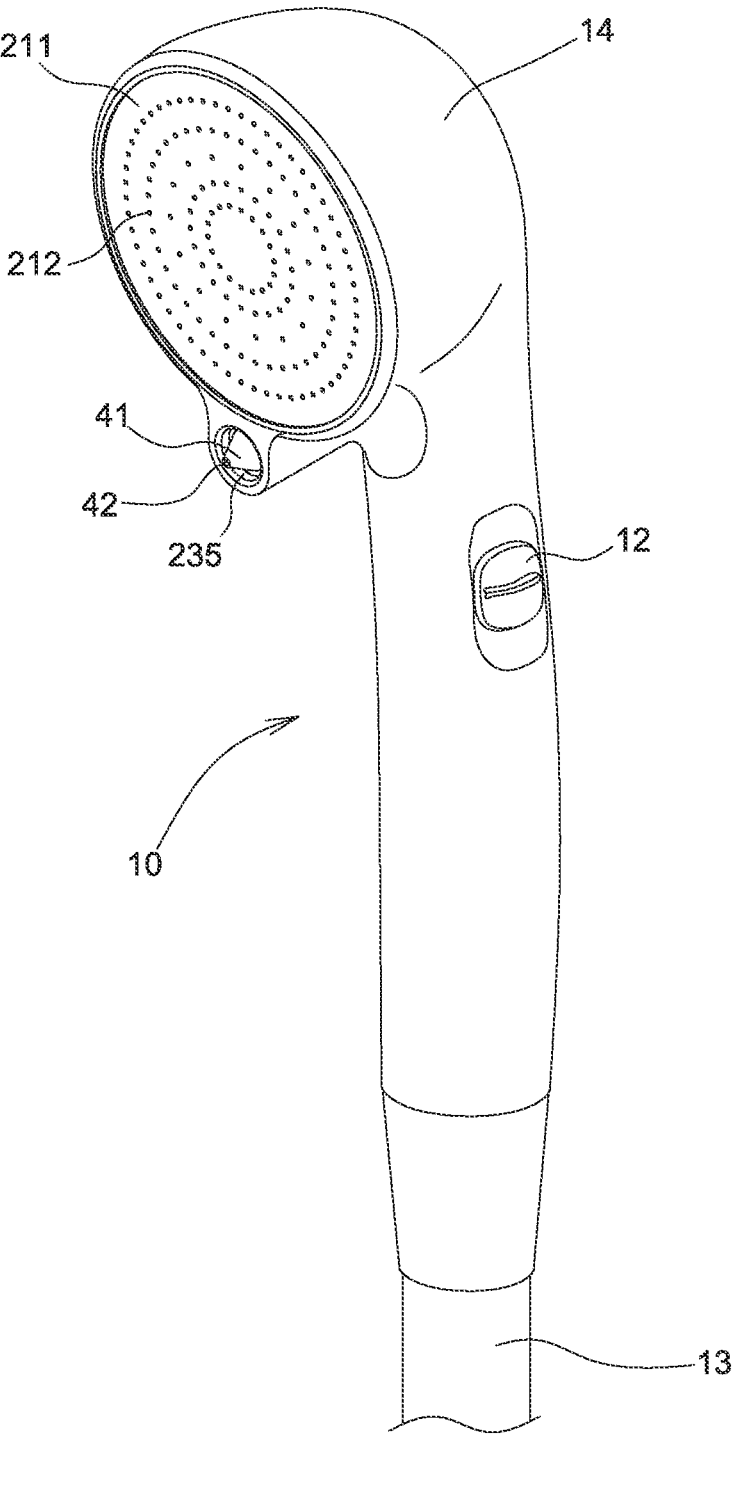
FIG. 1 is a perspective view showing the assembly of a shower head with a teeth flushing device according to a preferred embodiment of the present invention.
Figure 2:
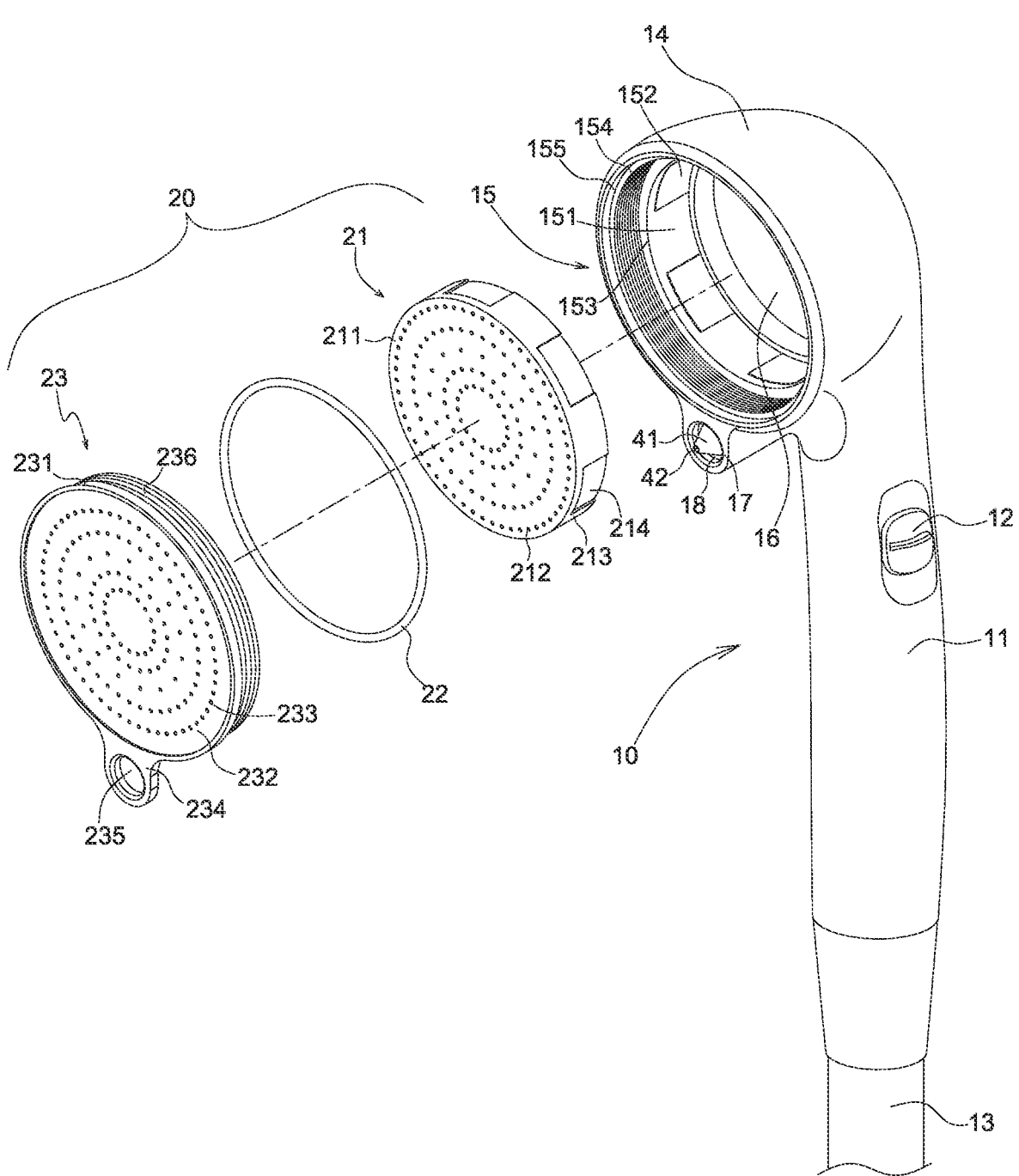
FIG. 2 is a perspective view showing the exploded components of the shower head with the teeth flushing device according to the preferred embodiment of the present invention.
Figure 3:
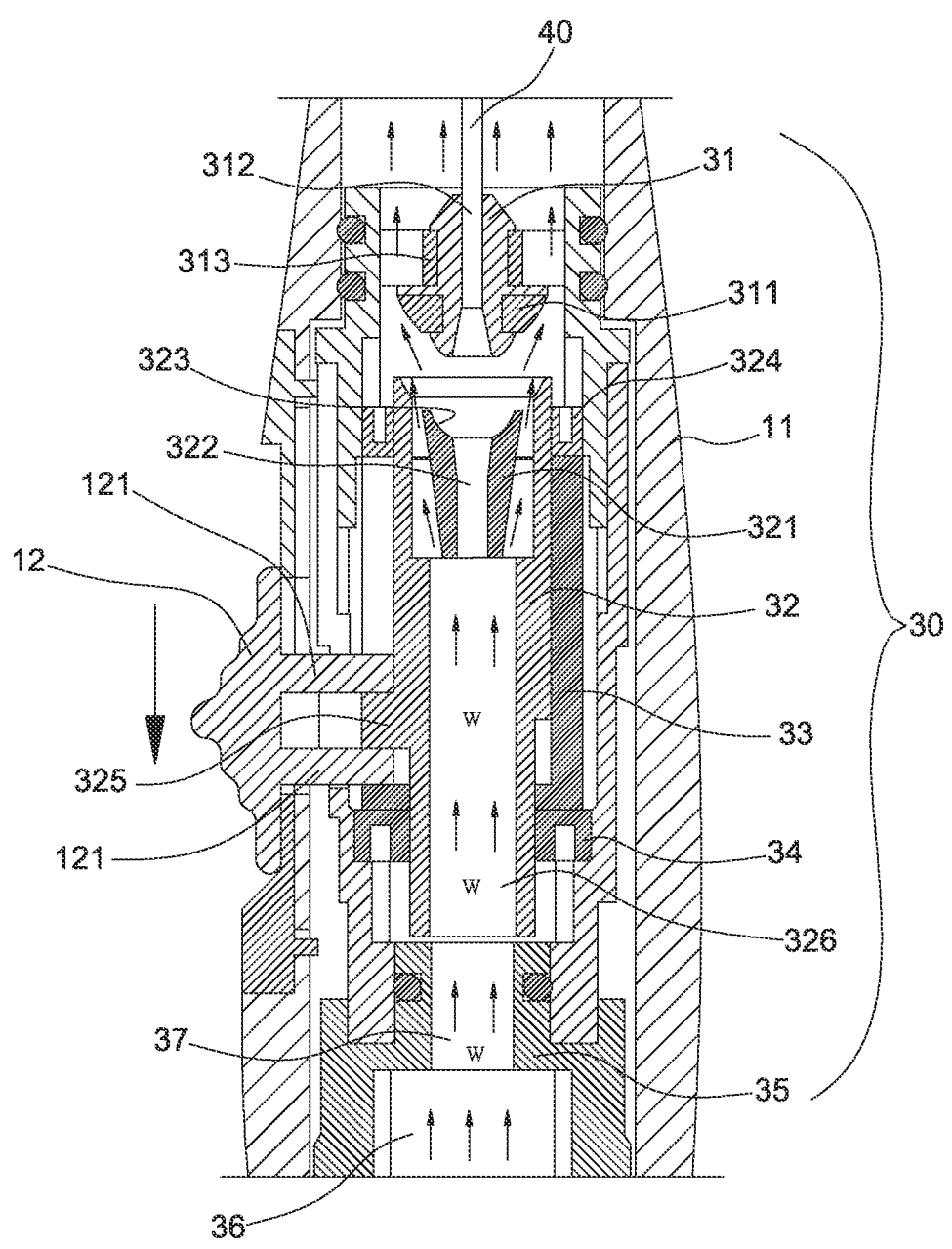
FIG. 3 is a cross sectional view showing the operation of the shower head with the teeth flushing device according to the preferred embodiment of the present invention.
Figure 4:
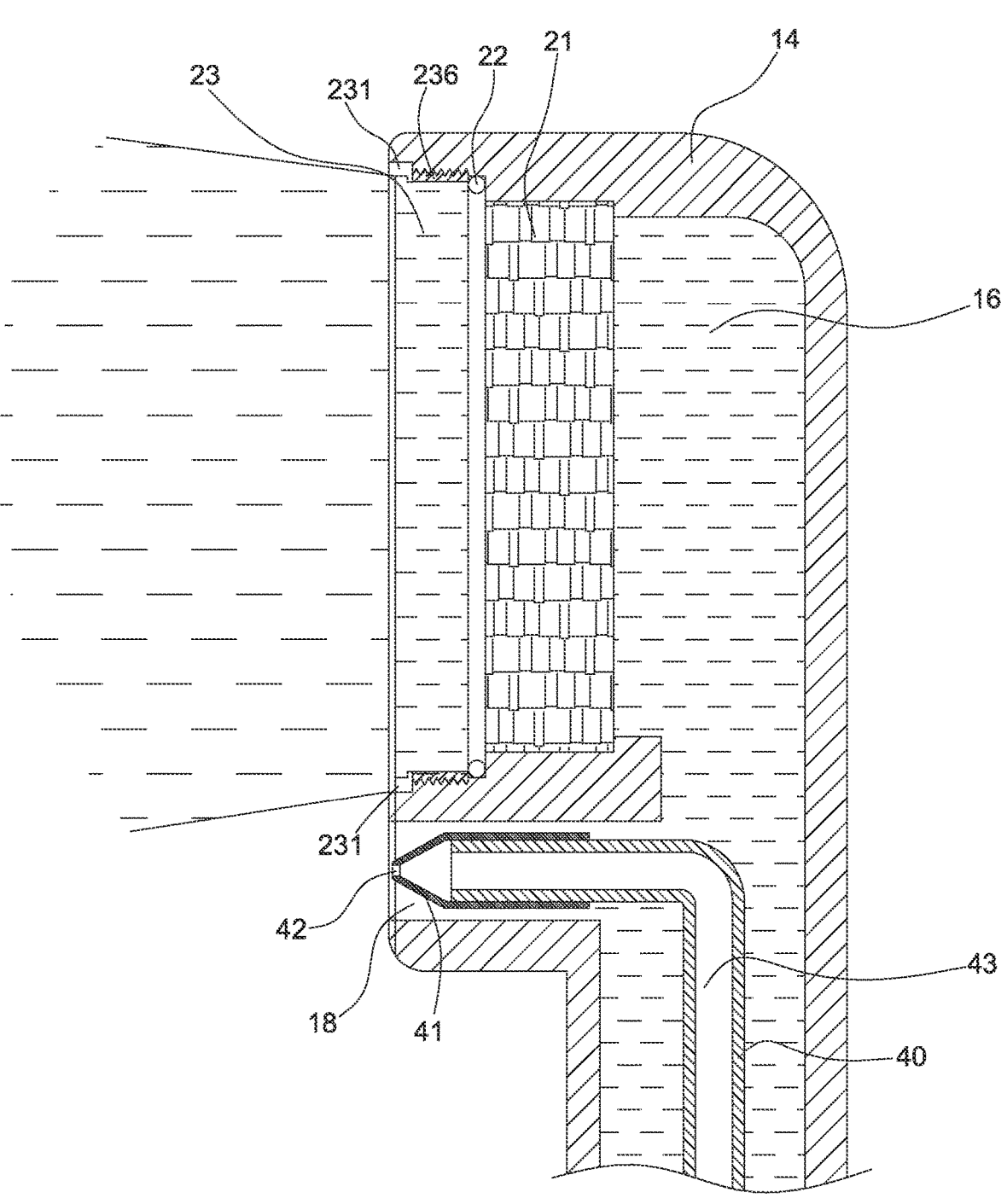
FIG. 4 is another cross sectional view showing the operation of the shower head with the teeth flushing device according to the preferred embodiment of the present invention.
Figure 5:
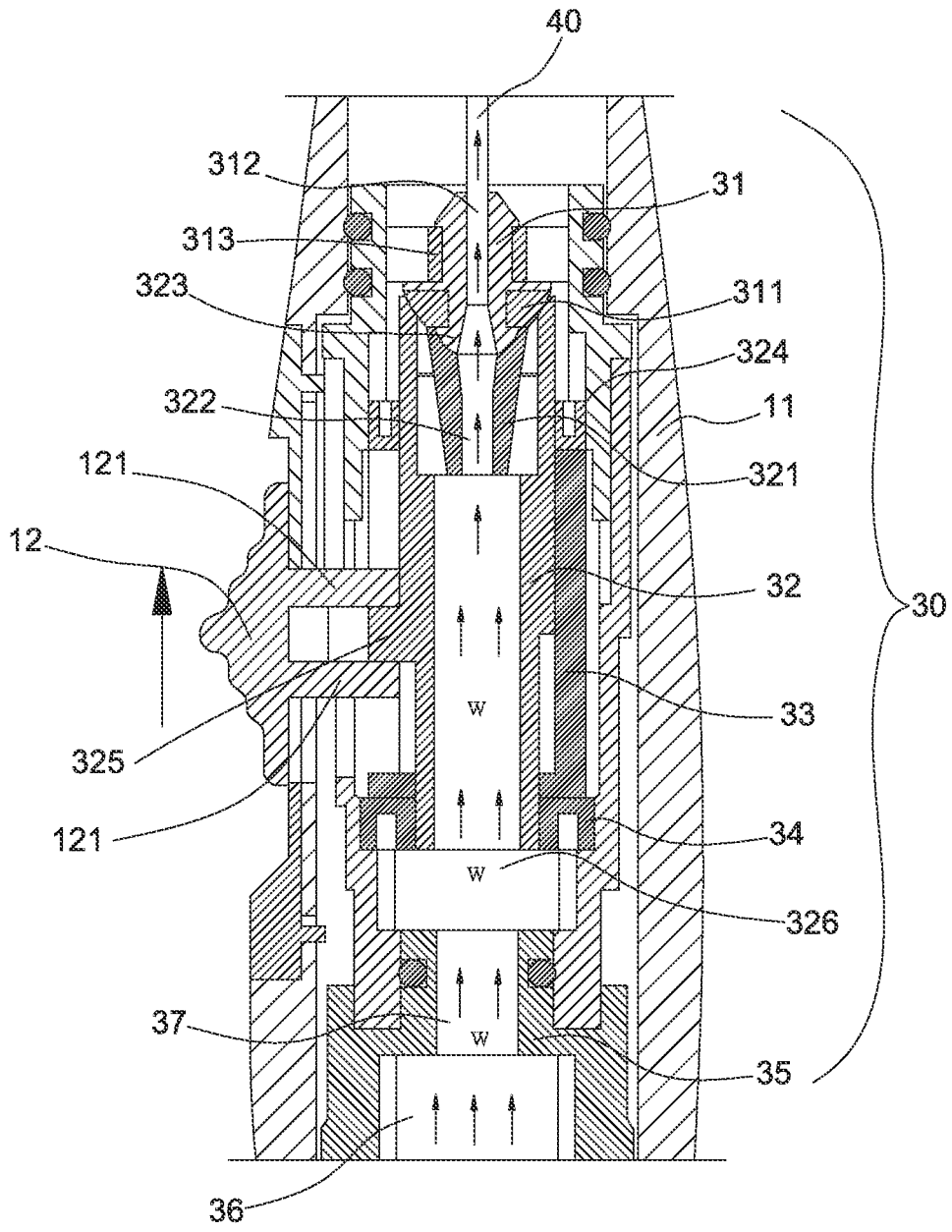
FIG. 5 is also another cross sectional view showing the operation of the shower head with the teeth flushing device according to the preferred embodiment of the present invention.
Figure 6:
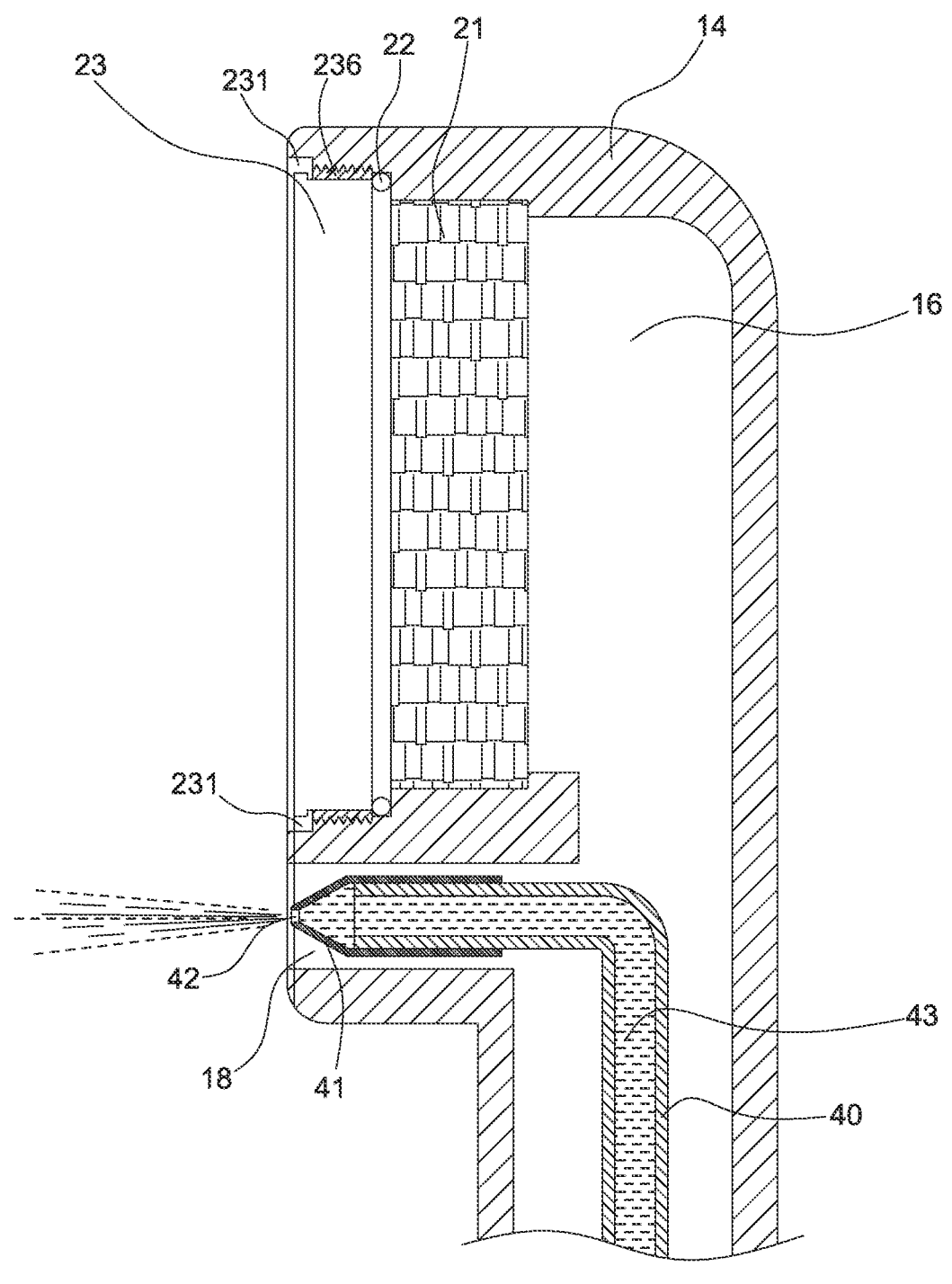
FIG. 6 is still another cross sectional view showing the operation of the shower head with the teeth flushing device according to the preferred embodiment of the present invention.

With reference to FIGS. 1-6, a shower head with a teeth flushing device according to a preferred embodiment of the present invention comprises: a body 10, a showing assembly 20, a switch button 12, a shift assembly 30, and a flushing pipe 40.

The body 10 includes a handle 11, a head portion 14 formed on a top of the handle 11, an inlet segment 13 formed on a bottom of the handle 11, a water supply chamber 15 defined in the head segment 14, an outlet segment 16 formed on a side of the water supply chamber 15, a tab 17 extending from a bottom of an end of the head portion 14, and a notch 18 defined in the tab 17.

The showering assembly 20 is connected with the water supply chamber 15 of the head portion 14 of the body 10 and located on a front end of the showering assembly 10.

The switch button 12 is movably disposed on a predetermined position of an outer wall of the handle 11 of the body 10 and is configured to be switched upward or downward, and the switch button 12 includes two locking extensions 121 extending inward therefrom.

The shift assembly 30 is accommodated in the handle 11 of the body 10 and located opposite to the switch button 12, wherein the shift assembly 30 includes a water distribution projection 31, and the water distribution projection 31 has a central orifice 312 defined thereon, a coupling portion 313 extending from an outer wall of the water distribution projection 31 relative to the body 10 and configured to fix the water distribution projection 31, a hemispherical rubber ring 311 arranged adjacent to a bottom of the water distribution projection 31, and a movable seat 32 fixed on the bottom of the water distribution projection 31, wherein the movable seat 32 has a first conduit 326 defined therein and corresponding to the central orifice 322, an actuated element 325 corresponding to the switch button 12 and driven by the switch button 12 to move the movable seat 32 upward and downward, wherein the movable seat 32 has a water guider 321 formed on a top thereof, and the movable seat 32 has a spherical abutting face 323 defined on the top thereof and configured to engage with or remove from the hemispherical rubber ring 311 of the water distribution projection 31, wherein the spherical abutting face 323 has a through orifice 322 defined thereon, such that when the spherical abutting face 323 of the water guider 321 engages with the hemispherical rubber ring 311 of the water distribution projection 31, the through orifice 322 is in communication with the central orifice 312.

The flushing pipe 40 includes a channel 43 defined thereon, wherein a first end of the flushing pipe 40 is connected on a top of the central orifice 312 of the water distribution projection 31, and the flushing pipe 40 includes a washing segment 41 extending from a second end thereof, a spray nozzle 42 defined on a center of the flushing pipe 40 and extending out of the notch 18 of the head portion 14 of the body 10 and an auxiliary guide orifice 235 of a cap 23.

When the switch button 21 is switched upward, the spherical abutting face 323 of the water guider 321 engages with the hemispherical rubber ring 311 of the water distribution projection 31 matingly so that water sprays out of the spray nozzle 42 of the washing segment 41 from the inlet segment 13 of the handle 11 via the first conduit 326 of the movable seat 32, the through orifice 322 of the water guider 321, the central orifice 312, and the flushing pipe 40. When the switch button 21 is switched downward, the spherical abutting face 323 of the water guider 321 disengages from the hemispherical rubber ring 311 of the water distribution projection 31 so that the water sprays out of the showering assembly 20 from the inlet segment 13 of the handle 11 via the outlet segment 16 and the water supply chamber 15.

The water supply chamber 15 of the head portion 14 of the body 10 includes a defining space 151, a stepped fringe 153, an internal threaded section 154, and a peripheral fence 155, wherein the defining space 151 has multiple locking protrusions 152 extending around an inner wall thereof. The showering assembly 20 includes a filter 21, a seal ring 22, and the cap 23. The filter 21 is accommodated in the defining space 151 of the head portion 14, the filter 21 has a holder 213 extending from an outer wall thereof, and the filter 21 has multiple recesses 214 configured to engage with the multiple locking protrusions 152 of the defining space 151, wherein the filter 21 also has a filtering face 211 defined thereon and multiple openings 212 formed on the filtering face 211. The seal ring 22 is connected with the stepped fringe 153 of the head portion 14, and the cap 23 has a surrounding frame 231, a shower element 232, an external threaded section 236 formed thereon, located beside the peripheral fence 155 and screwed with the internal threaded section 154 of the head portion 14, wherein the surrounding frame 231 is connected with the peripheral fence 155 of the head portion 14 so that the shower element 232 rotates relative to the surrounding frame 231, wherein the shower element 232 has multiple holes 233 defined thereon, and the surrounding frame 231 has a base 234 formed on a bottom thereof and corresponding to the head portion 14, wherein the base 234 has an aperture 235 corresponding to and aligned with the notch 18.

The handle 11 of the body 10 has a contact portion 33 defined therein relative to the movable seat 32, and the contact portion 33 has an air tight ring 34 fixed on a bottom thereof relative to the movable seat 32.

Preferably, the movable seat 32 has a fixer 35 formed on a bottom thereof, the fixer 35 has a second conduit 37 corresponding to the first conduit 326 of the movable seat 32, and the second conduit 37 has a third conduit 36 defined on a bottom thereof.

When desiring to take a shower by using the shower head, the switch button 12 is switched upward to drive the spherical abutting face 323 of the water guider 321 to engage with the hemispherical rubber ring 311 of the water distribution projection 31 matingly so that the water sprays out of the spray nozzle 42 of the washing segment 41 from the inlet segment 13 of the handle 11 via the first conduit 326 of the movable seat 32, the through orifice 322 of the water guider 321, the central orifice 312, and the flushing pipe 40. When desiring to flushing teeth of a user, the switch button 12 is switched downward so that the spherical abutting face 323 of the water guider 321 disengages from the hemispherical rubber ring 311 of the water distribution projection 31, and the water sprays out of the showering assembly 20 from the inlet segment 13 of the handle 11 via the outlet segment 16 and across the water guider 321. Thereby, the shower head of the present invention is capable of taking the shower and flushing the teeth.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A shower head with a teeth flushing device comprising:
   a body including a handle, a head portion formed on a top of the handle, an inlet segment formed on a bottom of the handle, a water supply chamber defined in the head segment, an outlet segment formed on a side of the water supply chamber, a tab extending from a bottom of an end of the head portion, and a notch defined in the tab;
   a showering assembly connected with the water supply chamber of the head portion of the body and located on a front end of the showering assembly;
   a switch button movably disposed on a predetermined position of an outer wall of the handle of the body and configured to be switched upward or downward, and the switch button including two locking extensions extending inward therefrom;
   a shift assembly accommodated in the handle of the body and located opposite to the switch button, wherein the shift assembly includes a water distribution projection, and the water distribution projection has a central orifice defined thereon, a coupling portion extending from an outer wall of the water distribution projection relative to the body and configured to fix the water distribution projection, a hemispherical rubber ring arranged adjacent to a bottom of the water distribution projection, and a movable seat fixed on the bottom of the water distribution projection, wherein the movable seat has a first conduit defined therein and corresponding to the central orifice, an actuated element corresponding to the switch button and driven by the switch button to move the movable seat upward and downward, wherein the movable seat has a water guider formed on a top thereof, and the movable seat has a spherical abutting face defined on the top thereof and configured to engage with or remove from the hemispherical rubber ring of the water distribution projection, wherein the spherical abutting face has a through orifice defined thereon, such that when the spherical abutting face of the water guider engages with the hemispherical rubber ring of the water distribution projection, the through orifice is in communication with the central orifice;
   a flushing pipe including a channel defined thereon, wherein a first end of the flushing pipe is connected on a top of the central orifice of the water distribution projection, and the flushing pipe includes a washing segment extending from a second end thereof, a spray nozzle defined on a center of the flushing pipe and extending out of the notch of the head portion of the body and an auxiliary guide orifice of a cap;
   wherein when the switch button is switched upward, the spherical abutting face of the water guider engages with the hemispherical rubber ring of the water distribution projection matingly so that water sprays out of the spray nozzle of the washing segment from the inlet segment of the handle via the first conduit of the movable seat, the through orifice of the water guider, the central orifice, and the flushing pipe; and
   wherein when the switch button is switched downward, the spherical abutting face of the water guider disengages from the hemispherical rubber ring of the water distribution projection so that the water sprays out of the showering assembly from the inlet segment of the handle via the outlet segment and the water supply chamber.

2. The shower head as claimed in claim 1, wherein the water supply chamber of the head portion of the body includes a defining space, a stepped fringe, an internal threaded section, and a peripheral fence, wherein the defining space has multiple locking protrusions extending around an inner wall thereof; the showering assembly includes a filter, a seal ring, and the cap; the filter is accommodated in the defining space of the head portion, the filter has a holder extending from an outer wall thereof, and the filter has multiple recesses configured to engage with the multiple locking protrusions of the defining space, wherein the filter also has a filtering face defined thereon and multiple openings formed on the filtering face; the seal ring is connected with the stepped fringe of the head portion, and the cap has a surrounding frame, a shower element, an external threaded section formed thereon, located beside the peripheral fence and screwed with the internal threaded section of the head portion, wherein the surrounding frame is connected with the peripheral fence of the head portion so that the shower element rotates relative to the surrounding frame, wherein the shower element has multiple holes defined thereon, and the surrounding frame has a base formed on a bottom thereof and corresponding to the head portion, wherein the base has an aperture corresponding to and aligned with the notch.

3. The shower head as claimed in claim 1, wherein the handle of the body has a contact portion defined therein relative to the movable seat, and the contact portion has an air tight ring fixed on a bottom thereof relative to the movable seat.

4. The shower head as claimed in claim 1, wherein the movable seat has a fixer formed on a bottom thereof, the fixer has a second conduit corresponding to the first conduit of the movable seat, and the second conduit has a third conduit defined on a bottom thereof.

\*  \*  \*  \*  \*